United States Patent [19]

Soules et al.

[11] Patent Number: 5,298,318
[45] Date of Patent: Mar. 29, 1994

[54] POLY(ARYLENE SULFIDE) RESINS REINFORCED WITH GLASS FIBERS

[75] Inventors: David A. Soules; Randy L. Hagenson, both of Bartlesville, Okla.

[73] Assignee: Phillips Petroleum Company, Bartlesville, Okla.

[21] Appl. No.: 796,756

[22] Filed: Mar. 21, 1990

[51] Int. Cl.$^5$ .................. B32B 17/04; C08K 3/36; C08K 3/40

[52] U.S. Cl. .................. 428/273; 428/285; 428/290; 428/902; 523/213; 524/269; 524/609

[58] Field of Search ............. 523/213; 524/269, 609; 428/273, 902

[56] References Cited

U.S. PATENT DOCUMENTS

| | | | |
|---|---|---|---|
| 3,873,489 | 3/1975 | Thurr et al. | 528/30 |
| 3,956,816 | 5/1976 | Short | 29/429 |
| 4,044,037 | 8/1977 | Mui et al. | 528/30 |
| 4,151,157 | 4/1979 | Williams et al. | 523/213 |
| 4,284,549 | 8/1981 | Salee | 524/262 |
| 4,337,182 | 6/1982 | Needham | 524/609 |
| 4,365,037 | 12/1982 | Adachi et al. | 524/609 |
| 4,451,601 | 5/1984 | Blackwell | 524/263 |
| 4,495,017 | 1/1985 | Abe et al. | 156/181 |
| 4,504,551 | 3/1985 | Leland | 428/419 |
| 4,528,310 | 7/1985 | Blackwell | 524/86 |
| 4,590,104 | 5/1986 | Zeiner et al. | 427/385.5 |
| 4,624,886 | 11/1986 | Cogswell et al. | 428/245 |
| 4,680,224 | 7/1987 | O'Connor | 428/294 |
| 4,680,326 | 7/1987 | Leland et al. | 524/609 |
| 4,735,828 | 4/1988 | Cogswell et al. | 427/359 |
| 4,790,970 | 12/1988 | Kurth et al. | 264/173 |
| 4,894,105 | 1/1990 | Dykstehouse et al. | 264/136 |
| 4,917,957 | 4/1990 | Nitoh et al. | 524/188 |

FOREIGN PATENT DOCUMENTS 125472 11/1984 European Pat. Off. .
176103 8/1987 Japan .

Primary Examiner—Richard D. Lovering
Attorney, Agent, or Firm—Morrison Bennett

[57] ABSTRACT

Continuous, woven and non-woven glass fibers are impregnated with certain silanes before use of the fibers to make reinforced thermoplastic composites using pultrusion or compression molding. Continuous, woven and non-woven glass fiber reinforced composites are also made by concurrently combining the fibers with certain silanes and a thermoplastic matrix material using pultrusion or compression molding.

34 Claims, No Drawings

POLY(ARYLENE SULFIDE) RESINS REINFORCED WITH GLASS FIBERS

BACKGROUND OF THE INVENTION

The present invention relates to fiber reinforced thermoplastic materials.

The production of thermoplastic material of poly(arylene sulfide) resins reinforced with unidirectional glass fibers by pultrusion has been disclosed. See, for example, U.S. Pat. No. 4,680,224. At least one fiber strand of continuous filaments is contacted with a poly(arylene sulfide) resin in the form of a powder or a slurry. The impregnated strand or strands are then pulled through a temperature controlled die for producing a composite which can have the form of, for example, a tape, a rod or a sheet.

The glass fiber reinforced pre-preg tapes produced in this manner are useful for such applications as structural members, aircraft parts, doctor blades, and the like.

Aliphatic sulfide type silanes have been used in glass reinforced poly(phenylene sulfide) compositions to improve hydrolytic stability. These have not been used for continuous unidirectional fiber reinforced poly(phenylene sulfide) and do not address the object of improving transverse tensile properties in prepreg tapes.

For some applications the continuous fiber reinforced thermoplastic prepreg tape will be more useful with improved transverse tensile strength and improved hydrolytic stability. For example, doctor blades used to process aqueous-based materials require materials of construction that have good hydrolytic stability. Likewise, structural members subjected to multi-directional high loads require materials of construction with, among other properties, good transverse tensile strength. Good transverse tensile strength also avoids continuous fiber composite microcracking and mitigates the propagation of microcracking under loaded conditions.

It is known in the art to produce materials of woven glass fibers impregnated with poly(arylene sulfide) resins by means of lamination processes. These materials have been used for such applications as structural members and aircraft parts. These materials can also benefit from improved hydrolytic stability and from improved interply strength.

SUMMARY OF THE INVENTION

It is an object of this invention to provide methods for impregnating continuous, woven and non-woven glass fibers with a silane or silanes to have fibers for use in fiber reinforced thermoplastics. Another object is to provide these silane impregnated fibers for use in fiber reinforced thermoplastic.

It is an object of this invention to provide a method for producing continuous fiber reinforced thermoplastic material in which the fibers are treated with silane prior to impregnation with a thermoplastic matrix material. It is also an object of this invention to provide a method for producing continuous fiber reinforced thermoplastic material in which the fibers are treated concurrently with the silane and a thermoplastic matrix material.

It is also an object of this invention to provide a method or methods for producing fiber reinforced thermoplastic prepreg tapes with improved transverse tensile strength. It is another object of this invention to provide a fiber reinforced thermoplastic material having improved transverse tensile strength properties.

It is still another object of this invention to provide an impregnated woven glass fabric composite with improved shear strength and a non-woven glass fabric composite with improved hydrolytic stability and a method for making these impregnated glass fabric composites.

In accordance with one embodiment of the present invention, glass fiber reinforced poly(arylene sulfide) prepreg tapes are prepared by passing single end glass roving through a slurry containing the poly(arylene sulfide) matrix material and a polysulfide organosilane.

In accordance with another embodiment of this invention, a woven glass fabric is impregnated with a poly(arylene sulfide) and silane composition.

DETAILED DESCRIPTION

The composites produced in accordance with this invention have improved adhesion of the resin to the glass as measured by transverse tensile strength and/or improved hydrolytic stability. Such materials having good transverse tensile strength also exhibit reduced levels of microcracking.

Examples of poly(arylene sulfide) resins contemplated as useful in making the compositions of this invention include those described in U.S Pat. No. 3,354,129 issued to Edmonds and Hill on Nov. 21, 1967, and those described in U.S. Pat. No. 3,919,177, issued to Campbell on Nov. 11, 1977. The presently preferred polymer is poly(phenylene sulfide).

The term poly(arylene sulfide) includes homopolymers and the normally solid arylene sulfide copolymers, terpolymers and the like having melting or softening points of at least about 150° C., and more preferably from about 200° C. to about 400° C. Other examples of poly(arylene sulfide) materials are poly(4,4-biphenylene sulfide), poly(2,4-tolylene sulfide), and a copolymer from p-dichlorobenzene, 2,4-dicblorotoluene and sodium sulfide and the like.

The term poly(phenylene sulfide,) includes homopolymers and copolymers containing ortho-, meta- and/or para-phenylene linkages on aryl groups in the polymer chain. Also included are aryl-substituted derviatives of these materials. Also included are poly(arylene sulfide sulfone), poly(arylene sulfide ketone) and poly(arylene sulfide diketone).

The organosilanes contemplated as useful in making the compositions of this invention include aromatic polysulfide silanes within the formula:

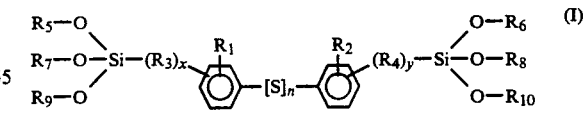

The number of sulfur atoms (S) linking the two aromatic groups is determined by the value of n which represents a positive integer and ranges from 1 to 30. A subgenus within the scope of this invention is represented by formula I wherein n ranges from 1 to 10. The preferred value for n is from 1 to 5.

Each of $R_1$ and $R_2$ is H or an alkyl group having from 1 to 30 carbon atoms. Each of $R_5$, $R_6$, $R_7$, $R_8$, $R_9$, and $R_{10}$ is an alkyl group having from 1 to 30 carbon atoms. The alkyl groups associated with $R_1$, $R_2$, $R_5$, $R_6$, $R_7$, $R_8$, $R_9$ and $R_{10}$ can be linear (e.g. n-propyl) or branched (e.g. tert-butyl). Examples of alkyl groups within the scope of this invention include, but are not limited to, the following:

—CH₃

—CH₂CH₃

—CH₂CH₂CH₃

—CH₂CH₂CH₂CH₃

—CH₂CHCH₃
    |
    CH₃

—CHCH₃
  |
  CH₃

—CHCH₂CH₃
  |
  CH₃

CH₃
    |
—C—CH₃
    |
    CH₃

—CH₂—(CH₂)₈—CH₃

CH₃
             |
—CH₂CH₂CH₂C—CH₃
             |
             CH₂
             |
             CH₂
             |
             CH₃

—CH₂(CH₂)₁₈—CH₃

CH₃      (CH₂)₅—CH₃
         |       /
—CH₂—(CH₂)₁₄—CH—C—CH₃
                 \
                  (CH₂)₄—CH₃

CH₃
              |
—CH—(CH₂)₁₀—CH—CH₃
  |
  CH₂
  |
  CH₂
  |
  CH₃

A subgenus within the scope of this invention is represented by formula I wherein each of $R_1$ and $R_2$ is H or an alkyl group having from 1 to 10 carbon atoms and each of $R_5$, $R_6$, $R_7$, $R_8$, $R_9$ and $R_{10}$ is an alkyl group having from 1 to 10 carbon atoms. Preferably, each of $R_1$ and $R_2$ is H or an alkyl group having from 1 to 5 carbon atoms and each of $R_5$, $R_6$, $R_7$, $R_8$, $R_9$ and $R_{10}$ is an alkyl group having from 1 to 5 carbon atoms. In an embodiment of this invention each of $R_1$ and $R_2$ represents a methyl group (—CH₃) and each of $R_5$, $R_6$, $R_7$, $R_8$, $R_9$ and $R_{10}$ represents an ethyl group (—CH₂CH₃).

Each of the letters x and y represents either 1 or 0. When x=0, $R_3$ is absent from formula I and the Si bond extends to a carbon member of the corresponding aromatic ring. When x=1, $R_3$ is as defined below. In a similar manner when y=0, $R_4$ is absent from formula I and the Si bond extends to a carbon member of the corresponding aromatic ring. When y=1, $R_4$ is as defined below.

Each of $R_3$ and $R_4$, when present (i.e. when x=1, y=1), is an alkylene group having from 1 to 30 carbon atoms. The alkylene group can be linear or branched. Examples of alkylene groups within the scope of this invention include, but are not limited to, the following:

—CH₂—

—CH₂CH₂—

—CH₂CH₂CH₂—

—CH₂CH₂CH₂CH₂—

—CHCH₂—
  |
  CH₃

CH₃
    |
—C—
    |
    CH₂CH₃

—CH₂CHCH₂—
       |
       CH₃

—CHCH₂CH₂—
  |
  CH₃

—CH₂(CH₂)₈CH₂—

CH₂CH₃
         |
—CH₂(CH₂)₂—C—CH₂CH₂—
         |
         CH₃

—CH₂(CH₂)₂₇CH₂—

CH₂(CH₂)₄CH₃
            |
—CH₂(CH₂)₂C—(CH₂)₃CH₂—
            |
            CH₂(CH₂)₆CH₃

A subgenus within the scope of this invention is represented by formula I wherein each of $R_3$ and $R_4$ (when present) is an alkylene group having from 1 to 10 carbon atoms. Preferably, each of $R_3$ and $R_4$ (when present) is an alkylene group having from 1 to 5 carbon atoms. In an embodiment of this invention each of $R_3$ and $R_4$ is present (i.e. x=1 and y=1) and represents an ethylene group (i.e. —CH₂CH₂—).

$R_1$ and $R_3$ (or Si when x=0) can be bonded to any available carbon atom of the corresponding aromatic ring, with the understanding that they cannot both be bonded to the same ring atom or to the ring atom to which the sulfur is bonded. The position of $R_1$ with respect to the sulfur substituent can be ortho, meta or para. The position of $R_3$ (or Si when x=0) with respect to the sulfur substituent can be ortho, meta or para. In a similar manner $R_2$ and $R_4$ (or Si when y=0) can be bonded to any available carbon atom of the corresponding aromatic ring, with the understanding that they cannot both be bonded to the same ring atom or to the ring atom to which the sulfur is bonded. The position of $R_2$ with respect to the sulfur substituent can be ortho, meta or para. The position of $R_4$ (or Si when y=0) with respect to the sulfur substituent can be ortho, meta or para. Examples of various orientations within the scope of this invention include, but are not limited to, the following:

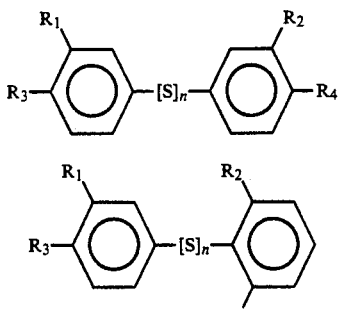
(II)

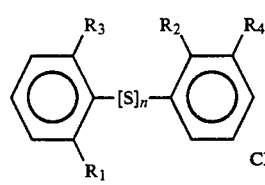
(III)

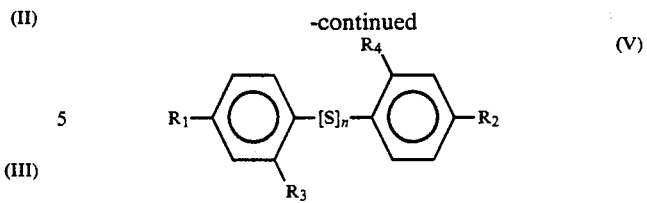
(V)

The preferred silane compounds of this invention are defined by the following chemical formula:

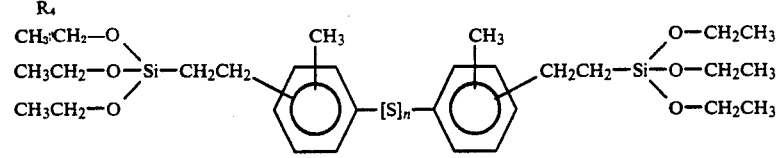
(VI)

where n is an integer from 1 to 5. Included are all positional isomers of the above. Examples include, but are not limited to, the following:

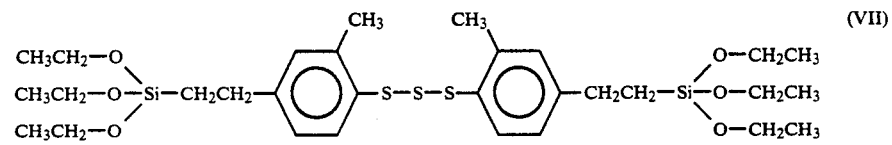
(VII)

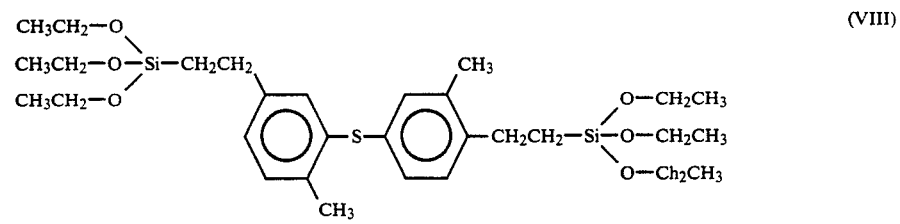
(VIII)

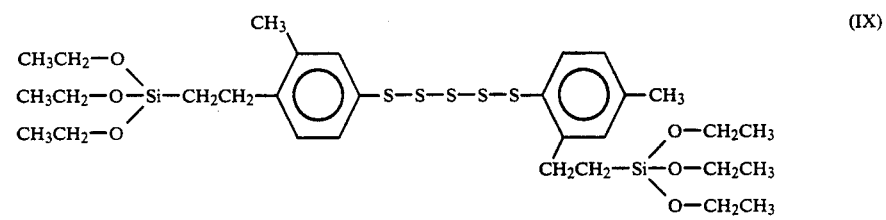
(IX)

The composition can contain more than one silane within the scope of formulas I through IX. By way of non-limiting example the poly(arylene sulfide) composition can contain the compounds VII, VIII and IX above. In one embodiment of this invention the poly(arylene sulfide) composition contains two or more silanes defined by

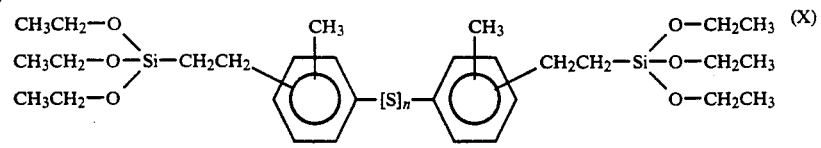
(X)

wherein the average value of n for the mixture is about 2 to about 4 and preferably about 2.8.

Presently preferred is a silane having the formula above wherein $R_1$ and $R_2$ are —$CH_3$; wherein $R_3$ and $R_4$ are —$CH_2CH_2$—; wherein $R_5$, $R_6$, $R_7$, $R_8$, $R_9$ and $R_{10}$ are —$CH_2CH_3$; wherein $x=1$ and $y=1$; wherein the average value of n is about 2.8. This material is commercially available from Union Carbide Corporation under the product name Ucarsil ™ RC-2 or as Y-9194.

Fiber Reinforced Pultruded Thermoplastics

The improved glass reinforced thermoplastic polymer produced by the method of the present invention has a number of characteristics which represent an improvement over the prior art, including improved retention of properties during prolonged exposure to moist environments and improved tensile properties in the material transverse to the direction of fiber orientation. Microcracking is substantially eliminated.

The fiber reinforced pultruded thermoplastics of the invention are basically comprised of poly(arylene sulfide) resin, glass reinforcing material, and at least one polysulfide organosilane.

The presently preferred composition of matter comprises substantially linear poly(phenylene sulfide) having a melt flow within the range of about 1 to about 800 grams per 10 minutes, unidirectionally aligned continuous glass fiber reinforcements, a silane content of from about 0.01 to about 5.0 weight percent based on weight of the glass or, more preferably, from about 0.05 to about 0.5 weight percent based on weight of the glass, and improved transverse tensile strength.

The scope of this invention, however, encompasses a much broader range and requires only that an amount of silane sufficient to increase the transverse tensile strength or to improve the hydrolytic stability of the resulting composition be used.

The poly(arylene sulfide) resin is present in the pultruded composite in an amount in the range of from about 20% to about 90% by weight of the composition, preferably in the range of from about 25% to about 60% by weight, and most preferably in the range of from about 25% to about 35% by weight.

The glass reinforcing material is present in the pultruded composite in an amount in the range of from about 80% to about 10% by weight of the total composition, preferably from about 40% to about 75% by weight, and most preferably from about 65% to about 75% by weight.

Continuous unidirectionally aligned glass fibers arranged in single end rovings are contemplated as a suitable reinforcement material. The glass fibers are available commercially. Examples include Certainteed 70C sized E glass and Certainteed 70D-11, with the latter being presently preferred. However, fiber contemplated as useful in this invention is not limited to single end roving, but may also be a conventional or assembled roving. Also, these examples are not to be construed as constraints on the diameter of fiber contemplated as useful in this invention.

A method for producing the unidirectional fiber reinforced thermoplastic material of this invention comprises any or all of the following steps:

(1) treating the continuous glass fiber with the chosen silane or silanes; thereafter (2) passing the glass fibers through a spray, slurry or other means of impregnation with the thermoplastic matrix material;

(3) passing the treated and impregnated glass fibers through an oven;

(4) giving the composite final shaping in a heated die.

Another method for producing the unidirectional fiber reinforced thermoplastic material of this invention comprises any or all of the following steps:

(1) preparing a slurry or emulsion comprising a thermoplastic resin, one or more of the chosen silanes and optionally other additives as needed;

(2) passing the continuous glass fibers through the slurry of step (1);

(3) passing the treated and impregnated glass fibers through an oven;

(4) giving the composite final shaping in a heated die.

Preferably the oven will maintain the temperature of the poly(arylene sulfide) at least as high as the melting point of the poly(arylene sulfide).

The examples following the description of non-woven glass fabric reinforced thermplastics will provide more detailed information about the procedures and tests used, and properties obtained.

Woven Glass Fabric Reinforced Thermoplastics

Another embodiment of the present invention provides methods for: (a) producing the improved impregnated woven fabric for making the woven glass reinforced thermoplastics of this invention; (b) making the woven glass reinforced thermoplastics using the glass from (a); and (e) making woven glass reinforced thermoplastics by use of a mixture containing resin and one or more polysulfide organosilanes.

One method for making the woven glass reinforced thermoplastic composite of this invention comprises any or all of the following steps as required: (1) burning off of any organic material on the woven glass fabric; (2) impregnating the woven glass fabric with one or more of the chosen silanes by any known method such as dipping or spraying, with or without solvent or slurry liquid; and (3) compression molding the treated glass fabric with the chosen thermoplastic to produce a laminate.

Additionally, the chosen silanes may be first combined with the chosen thermoplastic prior to the combination of the thermoplastic with the woven glass fabric in a compression molding or lamination process.

Also, the thermoplastic, woven glass fabric and silane may be combined using pultrusion techniques involving, for example, passing the woven fabric through a slurry bath containing the thermoplastic and the chosen silane. Alternatively, the glass fabric can first be combined with the chosen silane, then pultruded through a slurry of the thermoplastic.

The silanes described above are suitable for use in making the impregnated woven glass fabric of this invention. The woven glass fabric contemplated as useful in this invention is any used or available for applications such as plain weave or satin weave fiberglass fabrics.

The poly(arylene sulfide) resins described above are suitable for use in making the slurries, emulsions or mixtures for making the glass fabric reinforced thermoplastic composites using either woven glass fabric or silane impregnated woven glass fabric.

The woven glass fiber reinforced thermoplastic composites of this invention are from about 20 weight percent to about 60 weight percent poly(arylene sulfide) resin, preferably from about 30 weight percent to about 50 weight percent poly(arylene sulfide) resin, and most preferably from about 35 weight to about 45 weight percent poly(arylene sulfide) resin; from about 40 weight percent to about 80 weight percent glass fiber, preferably from about 50 weight percent to about 70 weight percent glass fiber, and most preferably from about 55 weight percent to about 65 weight percent glass fiber; and from about 0.01 weight percent to about 5 weight percent silane, more preferably from about 0.05 weight percent to about 1 weight percent silane, and most preferably from about 0.25 to about 0.5 weight percent silane based upon weight of the glass.

Non-Woven Glass Fabric Reinforced Thermoplastic

Non-woven glass fabric may also be used for producing glass fiber reinforced thermoplastic composites in accordance with this invention. The non-woven glass fabric may be used in compression molding or lamination to form glass fiber reinforced thermoplastic composites. The glass fiber may be impregnated with one or more chosen silanes before compression molding or lamination of the glass fiber to form the composite. Alternatively, one or more of the chosen silanes may be combined with the thermoplastic resin prior to use of the silane/resin mixture in forming non-woven glass fiber reinforced thermoplastic composites.

Non-woven glass fabric reinforced thermoplastic composites have ratios of thermoplastic to glass fiber and weight percentages of thermoplastic, silane and glass fiber similar to those for woven glass fabric reinforced thermoplastic as described above.

EXAMPLE I

This Example demonstrates the preparation and properties of unidirectional continuous glass fiber reinforced poly(phenylene sulfide). Compound 6 listed in Table 1, below, is an older, commercial grade of unidirectional continuous glass fiber reinforced poly(phenylene sulfide) made from an assembled glass roving, made without the added silanes of the present invention and made from a poly(phenylene sulfide) whose properties and preparation differ somewhat from those of the poly(phenylene sulfide) used in this invention. It is included in this Example to represent the "state of the art" at the time the work of the current invention was done.

With the exception of Compound 6 discussed above, all Compounds listed in the Tables below were made using techniques disclosed in U.S. Pat. No. 4,680,224, modified to include a curtain sprayer in the slurry bath and rolling redirect bars at any point the glass is wet. Likewise, all except Compound 6 were made using Certainteed 70-C sized E glass of either 20 micron diameter, 250 yield or 14 micron diameter, 450 yield. Finally, all except Compound 6 were made using 0.5 weight percent (for Table 1) or the indicated level (for Table 2) of the indicated silane in the slurry bath (based on the weight of resin in the slurry bath) and using a poly(phenylene sulfide) with a melt flow of approximately 50–150 g/10 min. (ASTM D1238-79, Procedure B, Condition 315/5.0, modified to use a 5 minute preheat time rather than the 6 minute minimum stated in the test method). Techniques disclosed in U.S. Pat. No. 3,919,177; U.S. Pat. Nos. 4,801,664 and/or 4,415,729 were used for preparation of the poly(phenylene sulfide) for the test. So that comparisons would be valid, only one lot (same flow rate and preparation method) of poly(arylene sulfide) was used within any test comparison listed below.

The unidirectional prepreg tape composite prepared as detailed above was converted into test specimens by compression molding into laminates using heated platen presses. For transverse tensile testing, the laminates were 10 inch by 10 inch unidirectional plates cut into the proper ASTM test specimens using a water cooled saw with a diamond blade. For the hydrolytic stability testing, the laminates were 14 inch by 14 inch $(\pm 45)_{3s}$ plates* cut as indicated above. For both types of laminates, molding conditions included 10 minutes contact at 625° F., opening and closing the press to release pressure at 40, 80 and 120 psi, 20 minutes at 150 psi and 2 hours at 400° F. at no applied pressure.

*In $(\pm 45)_{3s}$, using the + and − sign convention implies adjacent laminae (unidirectional tape) being oriented at angles equal in magnitude but opposite in sign. "$(\pm 45)_{3s}$" then defines alternating layers of unidirectional tape laid-up at an angle of first +45 and then −45 degrees (90 degrees with each other) in three layers (6 ply). The "s" denotes symmetry about the midplane with the final 12 ply layup being [+45, −45, +45, −45, +45, −45:−45, +45, −45, +45, −45, +45].

The data in Table 1, below, show the effect on transverse tensile strength of the resulting composite of the use of different silanes in the slurry bath during preparation of the composite. The data also show that even when no silane is used in the slurry bath, other factors, such as the glass fiber type, contribute, enhanced properties to a composite (Composite 1) which is superior in transverse tensile strength to the commercial product listed (Composite 6). Certainteed 70C, 450 yield glass was used for testing compounds 1 through 5 shown in Table 1.

The most striking effect discernible from the data in Table 1, however, is the markedly superior transverse tensile strength of the products made using polysulfide silanes in the slurry bath during composite preparation. As the data in Table 1 show, the products made using RC-2 silane exhibit transverse tensile strengths that are almost three times that of the product made using no silane and about six times that of the older, commercial grade of unidirectional glass fiber reinforced poly(phenylene sulfide).

TABLE 1

| Effect of Silane on Transverse Tensile Strength in a Flashed, Air-Cured Resin | | |
|---|---|---|
| Compound | Silane | Transverse Tensile Strength, ksi |
| 1 | None | 3.4 |
| 2 | A-189[a] | 6.3 |
| 3 | Prosil TM 2107[b] | 0.6 |
| 4 | Prosil TM 2210[c] | 3.9 |
| 5 | RC-2 | 9.1 |
| 6 (Commercial Product) | | 1.5 |

[a] A mercapto-functional organosilane commercially available from Union Carbide.
[b] A trialkoxy modified epoxysilane available from PCR, Inc., Gainesville, Florida.
[c] A trialkoxy modified epoxysilane available from PCR, Inc., Gainesville, Florida.

EXAMPLE II

This example demonstrates the effect which the use of the inventive composition has on hydrolytic stability of continuous unidirectional glass fiber reinforced poly(phenylene sulfide) composite.

Composite and test specimens were made and tested as in Example 1, with the following differences: (1) Glass used was Certainteed 70D-11, 20 micro diameter, 250 yield. (2) The poly(phenylene sulfide) had a melt flow of approximately 80 to 120 g/10 min. and was prepared using the techniques described in Example I except that the polymer was initially recovered from the polymerization mixture by partially cooling the mixture, and adding additional N-methyl-2-pyrrolidone.

Table 2 shows that use of the silane of this invention not only results in a composite with initially higher tensile strength but that the composite with silane also retains a higher percentage of its initial tensile strength after exposure, to high humidity conditions than does a corresponding composite made without the silane of the present invention.

TABLE 2

Effect of Silane on Hydrolytic Stability

| Compound | Silane Level[a] | Tensile Strength | | |
|---|---|---|---|---|
| | | Original[b] | Final[c] | Retention[d] |
| 7 | None | 49.11 | 34.52 | 70 |
| 8 | 0.5 | 68.91 | 58.11 | 84 |

[a]Expressed as weight percent, based on resin.
[b]In ksi, before exposure to hydrolysis conditions. 1 ksi = 1,000 psi.
[c]In ksi, after 14 days exposure to 95% relative humidity at 160 F.
[d]The percent retention of "original" tensile strength after the indicated exposure to hydrolysis conditions.

EXAMPLE III

This Example demonstrates the preparation and properties of unidirectional continuous glass fiber reinforced poly(phenylene sulfide sulfone) composite. Certainteed 70C, 14 micron diameter, 450 yield glass was used. Compounds listed in the Table 3 below were made using techniques and materials disclosed in Example 1, except that the thermoplastic resin used was 1 poly(phenylene sulfide sulfone) made using techniques disclosed in, for example, U.S. Pat. No. 4,016,145. The data in Table 3, below, show the effect on transverse tensile strength of the resulting composite of the use of RC-2 silane in the slurry bath during preparation of the composite. It can be seen that the transverse tensile strength of the product made using silane in the slurry bath during composite preparation is clearly superior to that of the product made without silane.

TABLE 3

Poly(phenylene Sulfide Sulfone) Composites

| Compound | Silane | Transverse Tensile Strength, ksi |
|---|---|---|
| 16 | None | 6.1 |
| 17 | RC-2 | 8.2 |

EXAMPLE IV

This example demonstrates the preparation, testing and properties of poly(phenylene sulfide) composites with woven glass fabric reinforcement which were made by treating the glass with silane prior to impregnation with the poly(phenylene sulfide). Comparison is made between poly(phenylene sulfide) composites containing RC-2 silane on the glass and those without silane on the glass.

The glass fabric used was type 7781 E-glass woven fabric available from several different suppliers. The commercial glass fabric was first beat treated to "barn off" any organic material which may be on it as sold. A part of this was set aside for use in forming the composite without silane on the glass fabric. RC-2 silane was added to the remainder of the beat treated woven glass fabric. The weight percent RC-2 incorporated on the glass was determined by testing samples of the treated fabric using the "loss on ignition" technique.

Laminates of the woven glass fiber fabric impregnated with poly(phenylene sulfide) of the same type used in the unidirectional fiberglass composites of Examples 1 and 2 were prepared by autoclaving alternating layers of the glass and polymer. Typical conditions used in this process were as follows. Alternating layers of the glass and polymer were heated to 600° F. over a period of 95 minutes and this temperature was held for 55 minutes. At the beginning of the heat up period, pressure was increased to about 20 psig over about 5 minutes. At 25 minutes into the 600° F. hold, pressure was increased at the rate necessary to achieve 150 psig 15 minutes later. This pressure was maintained until the end of the 600° F. hold. At the end of the 600° F. hold, the material was cooled with concurrent pressure reduction at rates such that pressure was reduced to zero psig over 50 minutes and temperature was reduced to about 120° F. over 73 minutes. At the end of the cool down, the autoclave was opened and the laminates were removed.

ASTM test specimens were cut from the laminates formed using the above process and were tested using the Four Point Interlaminar Shear Test which was introduced by Browning, Abrams and Whitney in 1983 as an alternative test method to yield the desired interlaminar shear failure mode in thin-beam graphite/epoxy laminates where the short beam shear test, ASTM D 2344, failed. (Browning, C. E., Abrams, F. L., and Whitney, J. M., "A Four-Point Shear Test for Graphite/Epoxy Composites," *Composite Materials: Quality Assurance and Processing, ASTM STP* 797, C. E. Browning, ed., American Society for Testing and Materials, 1983, pp. 54–74.) This test method is useful because of the consistent inability of the short beam shear test in interlaminar shear failure evaluation of thermoplastic composites such as PPS composites. The Four Point Shear strength test method is a modification of the four point flexural test, ASTM D790, wherein a support span only one half of that used in a flexural test is used to produce the interlaminar shear failure.

According to ASTM D790, the four point loading system utilizes two load points equally spaced from their adjacent support points, with a distance between load points (loading span) of one-third of the supporting span.

TABLE 4

Woven Glass Fabric/PPS Composite with RC-2

| RC-2 Level[a] | I-L Shear, Before[b] | I-L Shear, After[c] | Tensile Strength, ksi | |
|---|---|---|---|---|
| | | | Warp[d] | Filling[e] |
| Zero | 2.77 | 2.15 | 195 | 195 |
| 0.1 | 5.52 | 5.48 | 195 | 215 |
| 0.2 | 7.43 | 4.54 | 195 | 245 |
| 0.3 | 6.99 | 4.15 | 195 | 235 |
| 0.4 | 6.46 | 5.97 | 220 | 245 |
| 0.5 | 6.92 | 5.32 | 210 | 235 |

[a]Weight percent silane on glass fabric before combination with PPS, as determined by "loss on ignition."
[b]4-Point interlaminar shear strength, ksi, before hot-wet exposure.
[c]4-Point interlaminar shear strength, ksi, after hot-wet exposure by boiling in water for 2 hours.
[d]Tensile strength in warp direction of woven fiberglass cloth, ksi.
[e]Tensile strength in the fill direction of the woven fiberglass cloth, ksi.

The data in Table 4 show that a woven glass fiber reinforced thermoplastic product made with silane has markedly superior interlaminar shear strength both before and after exposure to hydrolysis conditions, compared with products made using no silane.

EXAMPLE V

This is an example of how a polysulfide silane is mixed with poly(arylene sulfide) thermoplastic resin prior to use of the silane/resin mixture in making continuous glass fiber reinforced composites.

The slurry concentration and amount of slurry needed for producing the composite will depend on such factors as the size of bath or baths, the line speed end properties of the fiber to be impregnated. This was determined empirically so as to produce a slurry which would result in a composite having 30±2 weight percent resin and 70±2 weight percent glass.

The main bath was 20.5 weight percent poly(phenylene sulfide) resin and the add bath was 30 weight percent poly(phenylene sulfide).

The appropriate amount of water was weighed in a large container and the pH was adjusted to approximately 4 by using acetic acid.

The silane chosen was Ucarsil TM RC-2, a polysulfide aromatic silane within formula I in the introductory part of the detailed description above. Ucarsil TM RC-2 was used at a concentration of 0.5% based on the weight of poly(phenylene sulfide) resin.

The surfactant used was Neodol 91-6 at a concentration of 0.26% based on the weight of poly(phenylene sulfide) resin. The appropriate amount of surfactant was weighed and added to the silane and stirred by hand until the mixture was uniform.

The silane/surfactant mixture was added to the water during very rigorous mixing. After all of the silane/surfactant mixture was added to the water, less vigorous stirring was continued for four hours. It is not necessary to stir rigorously after the emulsion has formed.

Then the poly(phenylene, sulfide) resin was added to the water/silane/surfactant mixture.

The resulting slurry was very thick (the slurry must not be used for 48 hours after it has been mixed in order to allow the silane to adsorb onto the poly(phenylene sulfide) resin). The mixture was stirred two or three times daily until use.

Table 5 below shows transverse tensile strength test results for composites prepared and tested as described in Example I using Certainteed 70D-11, 20 micron diameter, 250 yield unidirectional continuous glass fiber.

The various silanes were used at the 1.0 weight percent level based on resin weight. Emulsions rather than solutions were formed when RC-2, T2905 and B2494 were used. The DSC-18 was a solid. The A-1160 was water soluble.

TABLE 5

| Silane | Effect of Silane[a] Transverse Tensile Strength, ksi |
|---|---|
| None | 3.2 |
| DSC-18[b] | 5.0 |
| RC-2[c] | 7.8 |
| A-1160[d] | 3.3 |
| T2905[e] | 6.9 |
| B2494[f] | 6.9 |

[a]Coupling agent used at 1.0 weight percent, based on resin.
[b]A polymeric mercapto silane available from Harwick Chemical.
[c]The experimental silane available as Ucarsil TM RC-2 available from Union Carbide.
[d]gamma-Ureidopropyltriethoxy silane in alcohol available from Union Carbide.
[e]z-(trimethoxysilyl)ethylphenylsulfonyl Azide, available from Petrarch Systems.
[f]Bis[3-(triethoxysilyl)propyl]tetrasulfide, available from Petrarch Systems.

The data in Table 5 show that the type of silane used has a significant effect on the magnitude of the transverse tensile strength of the product, with RC-2 giving the most improved transverse tensile strength of those tested.

EXAMPLE VI

This is an example of making a lab scale batch of emulsion of silane to be used for treating of woven glass fiber fabric prior to compression molding the fabric with poly(arylene sulfide) resin to form a woven glass fiber reinforced thermoplastic composite.

A measured amount of double distilled water was put into a blender and the blender turned on low speed. The surfactant Triton X-100 was added dropwise to 500 ml of water and blended for forty seconds. Then enough RC-2 to achieve a loss on ignition of 0.3 to 0.5 percent based on the glass was added to the surfactant and water mixture and blended on low speed for five minutes, then allowed to set for twenty-five minutes, then blended on low speed for ten more minutes.

While the articles of manufacture, compositions of matter, and methods of this invention have been described in detail for the purpose of illustration, the inventive articles, compositions and processes are not to be construed as limited thereby. This patent is intended to cover all changes and modifications within the spirit and scope thereof.

That which is claimed is:

1. A method of preparing a continuous glass fiber reinforced thermoplastic composite comprising:
   (a) passing continuous glass fibers through a slurry bath containing a mixture of poly(arylene sulfide) having a melt flow within the range of about 1 to about 800 grams per 10 minutes and at least one polysulfide organosilane, to impregnate said glass fibers; and
   (b) heating and shaping said impregnated glass fibers.

2. A method as in claim 1 wherein said silane is within the formula:

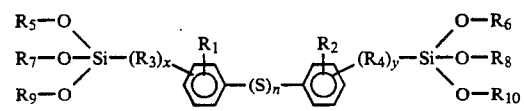

wherein n is an integer from 1 to 30; wherein each of $R_1$ and $R_2$ is H or an alkyl group having 1 to 30 carbon atoms; wherein each of $R_5$, $R_6$, $R_7$, $R_8$, $R_9$ and $R_{10}$ is an alkyl group having from 1 to 30 carbon atoms; wherein x is 0 or 1; wherein y is 0 to 1; and wherein each of $R_3$ and $R_4$ is an alkylene group having from 1 to 30 carbon atoms.

3. A method according to claim 2 wherein said poly(arylene sulfide) is poly(phenylene sulfide).

4. A method according to claim 2 wherein said poly(arylene sulfide) is poly(phenylene sulfide sulfone).

5. A method of preparing a continuous glass fiber reinforced thermoplastic composite comprising:
   (a) impregnating continuous glass fibers with at least one polysulfide organosilane within the formula:

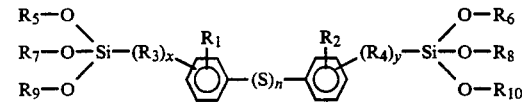

wherein n is an integer from 1 to 30; wherein each of $R_1$ and $R_2$ is H or an alkyl group having 1 to 30 carbon atoms; wherein each of $R_5$, $R_6$, $R_7$, $R_8$, $R_9$ and $R_{10}$ is an alkyl group having from 1 to 30 carbon atoms; wherein x is 0 or 1; wherein y is 0 to 1; and wherein each of $R_3$ and $R_4$ is an alkylene group having from 1 to 30 carbon atoms;
   (b) thereafter impregnating said continuous glass fibers with poly(arylene sulfide) having a melt flow within the range of about 1 to about 800 grams per 10 minutes;
   (c) heating and shaping said impregnated continuous glass fibers.

6. A method according to claim 5 wherein said poly(arylene sulfide) is poly(phenylene sulfide).

7. A method according to claim 5 wherein said poly(arylene sulfide) is poly(phenylene sulfide sulfone).

8. A method of making a glass fiber reinforced thermoplastic composite comprising:
   (a) impregnating a woven glass fabric with at least one silane within the formula:

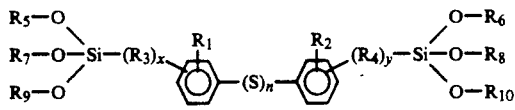

wherein n is an integer from 1 to 30; wherein each of $R_1$ and $R_2$ is H or an alkyl group having 1 to 30 carbon atoms; wherein each of $R_5$, $R_6$, $R_7$, $R_8$, $R_9$ and $R_{10}$ is an alkyl group having from 1 to 30 carbon atoms; wherein x is 0 or 1; wherein y is 0 or 1; and wherein each of $R_3$ and $R_4$ is an alkylene group having from 1 to 30 carbon atoms; and
   (b) thereafter compression molding one or more of said woven glass fabrics with poly(arylene sulfide) having a melt flow within the range from about 1 to about 800 grams per 10 minutes.

9. A method according to claim 8 wherein organics are burned off from said woven glass fabric before said woven glass fabric is impregnated with said silane.

10. A method according to claim 8 wherein said poly(arylene sulfide) is poly(phenylene sulfide).

11. A method according to claim 8 wherein said poly(arylene sulfide) is poly(phenylene sulfide sulfone).

12. A method of making a glass fiber reinforced thermoplastic composite comprising laminating one or more woven glass fiber fabrics with a mixture of poly(arylene sulfide) having a melt flow within the range from about 1 to about 800 grams per 10 minutes and at least one polysulfide organosilane having the formula:

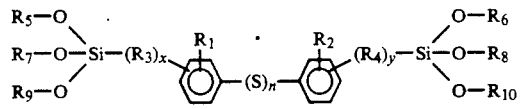

wherein n is an integer from 1 to 30; wherein each of $R_1$ and $R_2$ is H or an alkyl group having 1 to 30 carbon atoms; wherein each of $R_5$, $R_6$, $R_7$, $R_8$, $R_9$ and $R_{10}$ is an alkyl group having from 1 to 30 carbon atoms; wherein x is 0 or 1; wherein y is 0 or 1; and wherein each of $R_3$ and $R_4$ is an alkylene group having from 1 to 30 carbon atoms.

13. A method according to claim 12 wherein said mixture has from about 20 to about 60 weight percent poly(arylene sulfide) based on weight of said mixture of said poly(arylene sulfide) and said glass fiber; and wherein said mixture has from about 0.01 to about 5 weight percent of said silane based on weight of said glass fiber.

14. A method according to claim 12 wherein said poly(arylene sulfide) is poly(phenylene sulfide).

15. A method according to claim 12 wherein said poly(arylene sulfide) is poly(phenylene sulfide sulfone).

16. A method of preparing a glass fiber reinforced thermoplastic composite comprising:
   (a) impregnating said non-woven glass fabric with at least one silane within the formula:

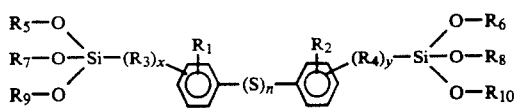

wherein n is an integer from 1 to 30; wherein each of $R_1$ and $R_2$ is H or an alkyl group having 1 to 30 carbon atoms; wherein each of $R_5$, $R_6$, $R_7$, $R_8$, $R_9$ and $R_{10}$ is an alkyl group having from 1 to 30 carbon atoms; wherein x is 0 or 1; wherein y is 0 or 1; and wherein each of $R_3$ and $R_4$ is an alkylene group having from 1 to 30 carbon atoms;
   (b) compression molding one or more layers of said impregnated non-woven glass fabric with poly(arylene sulfide) having a melt flow within the range of about 1 to about 800 grams per 10 minutes.

17. A method according to claim 16 wherein organics are burned off from said non-woven glass fabric before said non-woven glass fabric is impregnated with said silane.

18. A method according to claim 16 wherein said poly(arylene sulfide) is poly(phenylene sulfide).

19. A method according to claim 16 wherein said poly(arylene sulfide) is poly(phenylene sulfide sulfone).

20. A method of preparing a glass reinforced thermoplastic composite comprising compression molding one or more layers of non-woven glass fabric with a mixture of poly(arylene sulfide) having a melt flow within the range of about 1 to about 800 grams per 10 minutes and at least one silane within the formula:

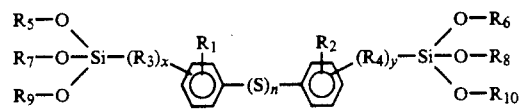

wherein n is an integer from 1 to 30; wherein each of $R_1$ and $R_2$ is H or an alkyl group having 1 to 30 carbon atoms; wherein each of $R_5$, $R_6$, $R_7$, $R_8$, $R_9$ and $R_{10}$ is an alkyl group having from 1 to 30 carbon atoms; wherein x is 0 or 1; wherein y is 0 or 1; and wherein each of $R_3$ and $R_4$ is an alkylene group having from 1 to 30 carbon atoms.

21. A method according to claim 20 wherein organics are burned off from said non-woven glass fabric before said non-woven glass fabric is compression molded with said mixture of said poly(phenylene sulfide) and said silane.

22. A method according to claim 20 wherein said poly(arylene sulfide) is poly(phenylene sulfide).

23. A method according to claim 20 wherein said poly(arylene sulfide) is poly(phenylene sulfide sulfone).

24. A woven glass fiber reinforced composite comprising:
   (a) poly(arylene sulfide) having a melt flow within the range of about 1 to about 800 grams per 10 minutes;
   (b) at least one silane within the formula:

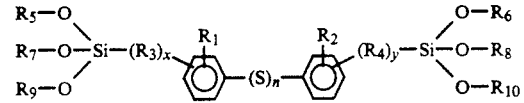

wherein n is an integer from 1 to 30; wherein each of $R_1$ and $R_2$ is H or an alkyl group having 1 to 30 carbon atoms; wherein each of $R_5$, $R_6$, $R_7$, $R_8$, $R_9$ and $R_{10}$ is an alkyl group having from 1 to 30 carbon atoms; wherein x is 0 or 1; wherein y is 0 or 1; and wherein each of $R_3$ and $R_4$ is an alkylene group having from 1 to 30 carbon atoms; and (c) a woven glass fabric.

25. A composite according to claim 24 wherein n is an integer from 1 to 10; wherein each of $R_1$ and $R_2$ is H or an alkyl group having 1 to 10 carbon atoms; wherein each of $R_5$, $R_6$, $R_7$, $R_8$, $R_9$ and $R_{10}$ is an alkyl group having from 1 to 10 carbon atoms; wherein x=1; wherein y=1; and wherein each of $R_3$ and $R_4$ is an alkylene group having from 1 to 10 carbon atoms.

26. A composite according to claim 24 wherein n is an integer from 1 to 5; wherein each of $R_1$ and $R_2$ is H or an alkyl group having 1 to 5 carbon atoms; wherein each of $R_5$, $R_6$, $R_7$, $R_8$, $R_9$ and $R_{10}$ is an alkyl group having from 1 to 5 carbon atoms; and wherein each of $R_3$ and $R_4$ is an alkylene group having from 1 to 5 carbon atoms.

27. A composite according to claim 24 wherein (a) is poly(phenylene sulfide); wherein each of $R_1$ and $R_2$ is —$CH_3$; wherein each of $R_5$, $R_6$, $R_7$, $R_8$, $R_9$ and $R_{10}$ is —$CH_2CH_3$; wherein x=1; wherein y=1; and wherein each of $R_3$ and $R_4$ is —$CH_2CH_2$—.

28. A composite according to claim 24 wherein said poly(arylene sulfide) is poly(phenylene sulfide sulfone) and wherein each of $R_1$ and $R_2$ is —$CH_3$; wherein each of $R_5$, $R_6$, $R_7$, $R_8$, $R_9$ and $R_{10}$ is —$CH_2CH_3$; wherein x=1; wherein y=1; and wherein each of $R_3$ and $R_4$ is —$CH_2CH_2$—.

29. A composition according to claim 24 wherein (b) is a plurality of silanes within said formula; and wherein the average value of n for said plurality of silanes is about 2 to about 4.

30. A composite according to claim 24 wherein said composite is from about 20 weight percent to about 60 weight percent of said poly(arylene sulfide) and from about 80 weight percent to about 40 weight percent of said glass fiber based on total weight of said composite; and wherein there is from about 0.01 weight percent to about 5 weight percent of said silane based on weigh percent of said glass fiber.

31. A non-woven glass fiber reinforced composite comprising:

(a) poly(arylene sulfide) having a melt flow within the range of about 1 to about 800 grams per 10 minutes;

(b) at least one silane within the formula:

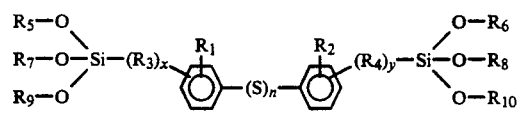

wherein n is an integer from 1 to 30; wherein each of $R_1$ and $R_2$ is H or an alkyl group having 1 to 30 carbon atoms; wherein each of $R_5$, $R_6$, $R_7$, $R_8$, $R_9$ and $R_{10}$ is an alkyl group having from 1 to 30 carbon atoms; wherein x is 0 or 1; wherein y is 0 or 1; and wherein each of $R_3$ and $R_4$ is an alkylene group having from 1 to 30 carbon atoms; and (c) a non-woven glass fabric.

32. A composite according to claim 31 wherein said poly(arylene sulfide) is poly(phenylene sulfide).

33. A composite according to claim 31 wherein said poly(arylene sulfide) is poly(phenylene sulfide sulfone).

34. A composite according to claim 31 wherein said composite is from about 20 weight percent to about 80 weight percent of said poly(arylene sulfide) and from about 80 weight percent to about 20 weight percent of said glass fiber based on total weight of said composite; and wherein there is from about 0.01 weight percent to about 5 weight percent of said silane based on weight percent of said glass fiber.

* * * * *

UNITED STATES PATENT AND TRADEMARK OFFICE
CERTIFICATE OF CORRECTION

PATENT NO. : 5,298,318

DATED : March 29, 1994

INVENTOR(S) : David A. Soules; Randy L. Hagenson

It is certified that error appears in the above-identified patent and that said Letters Patent is hereby corrected as shown below:

Title page, item [21], delete "796,756" and substitute --- 496,756 --- therefor.

Claim 30, column 18, line 4, delete "weigh" at the end of the line and substitute --- weight --- therefor.

Signed and Sealed this

Sixth Day of September, 1994

Attest:

BRUCE LEHMAN

Attesting Officer

Commissioner of Patents and Trademarks